UNITED STATES PATENT OFFICE.

DMITRY ALEXANDROWITCH PÉNIAKOFF, OF HUY, BELGIUM.

PROCESS OF MAKING ALUMINATE.

SPECIFICATION forming part of Letters Patent No. 572,026, dated November 24, 1896.

Application filed April 5, 1895. Serial No. 544,657. (No specimens.) Patented in Austria-Hungary January 28, 1893, No. 43,718; in France April 5, 1893, No. 229,154; in England April 5, 1893, No. 20,604; in Germany May 9, 1893, No. 79,781; in Belgium October 4, 1893, No. 106,630; in Luxemburg December 12, 1893, No. 1,942; in Italy December 31, 1893, No. 53,001, and in Spain February 9, 1894, No. 15,321.

*To all whom it may concern:*

Be it known that I, DMITRY ALEXANDROWITCH PÉNIAKOFF, a subject of the Czar of Russia, residing in Huy, Belgium, have invented a new and useful Process of Obtaining Alumina and Simultaneously Alkali Carbonate and Chlorin, (for which I have obtained a patent in France, No. 229,154, dated April 5, 1893; in Belgium, No. 106,630, dated October 4, 1893; in Italy, No. 53,001, dated December 31, 1893; in England, No. 20,604, dated April 5, 1893; in Germany, No. 79,781, dated May 9, 1893; in Luxemburg, No. 1,942, dated December 12, 1893; in Spain, No. 15,321, dated February 9, 1894, and in Austria, No. 43,718, dated January 28, 1893,) of which the following is a specification.

This invention relates generally to a process or method of obtaining alumina from bauxite or other substances containing alumina by converting such substances into alkaline aluminates, and the invention also extends to the action exercised by the gases which develop in the course of performance of such process upon chlorids of alkalies which decompose in consequence and in the well-known manner become transformed into chlorin and alkaline sulfates.

The main advantage of the process herein described resides in the thorough and complete utilization of all the final products that are obtained, a feature of paramount importance if considered in the light of the economy which it is desirable to realize in the cost price of the products in question.

By the method hitherto employed the bauxite has been first fused or melted with alkalies or alkaline carbonates, an alkaline aluminate soluble in water being the result. This soluble aluminate remains in solution, while the oxid of iron which originates from the bauxite separates. After the solution of aluminate has been separated from the precipitate of oxid of iron it is treated with carbonic acid, whereby an alkaline carbonate is obtained from which alumina is precipitated. Now I have found that the alkaline aluminate referred to may be obtained in a more advantageous manner by the employment of an alkaline sulfate instead of an alkaline carbonate if the sulfate of alkali be mixed with one-fifth of its weight of sulfuret of alkali, when a reaction will take place according to the following formula:

(1) $4Al_2O_3 + Na_2S + 3Na_2SO_4 = 8AlNaO_2 + 4SO_2.$ 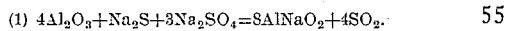

A material advantage may be derived from substituting pyrite for the alkaline sulfuret, as that will cause a far more energetic reaction to set in, as expressed by the following formula:

(2) $11Al_2O_3 + 2FeS_2 + 11Na_2SO_4 = 22AlNaO_2 + 15SO_2 + Fe_2O_3,$ 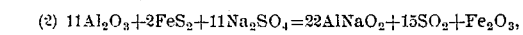

or (3) $5Al_2O_3 + FeS_2 + 5Na_2SO_4 = 10AlNaO_2 + FeO + 7SO_2,$ 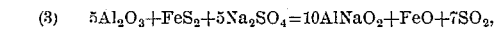

one part of pyrite being used for every four or five parts of alkaline sulfate. The whole amount of sulfur contained in the pyrite is at the same time by combustion converted into sulfurous acid, the yield in sulfurous acid obtained exceeding thirty-six per cent.

Identical results might be attained in the manufacture of aluminates by starting the operation not with alumina itself, but with some other material (such as sulfate of alumina) containing alumina, as will be seen from the following formulæ:

(4) $4Al_2(SO_4)_3 + 4Na_2S = 8AlNaO_2 + 16SO_2.$ 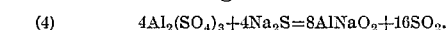
(5) $5Al_2(SO_4)_3 + 4FeS_2 + 5Na_2SO_4 = 10AlNaO_2 + 4FeO + 2SO_2.$ 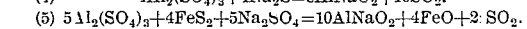

The chief advantage resulting from the employment of a sulfate of an alkali in combination with the sulfuret of an alkali or a pyrite is that absolutely pure sulfurous-acid gas is obtained, which can be conveniently employed for the production of an alkaline sulfate and chlorin, the reaction being expressed by the following equation:

$$2NaCl + SO_2 + 2O = Na_2SO_4 + Cl_2.$$
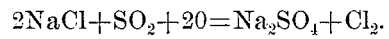

This reaction has been mentioned by Hargreaves and other chemists, but hitherto the reaction could not be availed of for the manufacture of chlorin on a commercial scale, for the reason that heretofore sulfurous-acid gas has been used in a very diluted condition, the gases escaping from pyrite-furnaces being employed for accomplishing this reaction. These gases never contain more than eight per cent. of sulfurous-acid gas, while the sulfurous-acid gas resulting from my process is concentrated, and in such condition has been found to act much more energetically than the furnace-gases employed hitherto.

If it be desired to make the gaseous mixture richer still in active components, the requisite quantity of oxygen may be obtained by the aid of any of the well-known oxygen-transferring agents, such as bioxid of barium, manganate of calcium, plumbite of potassium, or sulfate of copper, which are capable of being easily regenerated.

Technically speaking, the whole process is exceedingly simple.

In any convenient furnace a mixture of an alkaline sulfate and an alkaline sulfuret is heated to incandescence, whereupon the material containing the alumina is added, the mass being then thoroughly mixed or stirred, or an equivalent method would consist in first carefully mixing the alkaline sulfate with the alkaline sulfuret or pyrite, directly adding thereto the material containing alumina and not applying the heat until after this complete mixture has been prepared. The gas generated in the course of this operation is mixed with an adequate amount of heated air and conducted through retorts filled with intensely-calcined alkaline chlorid. The chlorin which will form in consequence is utilized in the well-known manner. The alkaline aluminate obtained in the first stage of the process is decomposed by means of carbonic acid into pure alumina and an alkaline carbonate in the usual manner.

If barium sulfate is substituted for the alkaline sulfate, the reaction will be analogous and the soluble aluminate of barium will be formed.

Having now particularly described and ascertained the nature of my said invention and in what manner the same is to be performed, I declare that what I claim is—

1. The herein-described process for the production of aluminates which consists in heating a substance containing alumina in the presence of a sulfate and a sulfuret, substantially as described.

2. The herein-described process for the production of alkaline sulfates and chlorin which consists in heating a substance containing alumina in the presence of a sulfate and a sulfuret, converting the entire amount of sulfur into sulfurous-acid gas, mixing said sulfurous-acid gas with oxygen and bringing it in contact with an alkaline chlorid to produce chlorin and alkaline sulfate, substantially as described.

3. The herein-described process for the production of alkaline aluminates, which consists in heating a substance containing alumina, in the presence of an alkaline sulfate and a sulfuret, substantially as set forth.

4. The herein-described process for the production of alkaline aluminates, which consists in heating a substance containing alumina, in the presence of an alkaline sulfate and an alkaline sulfuret, substantially as set forth.

5. The herein-described process for the production of alkaline aluminates and chlorin, which consists in heating a substance containing alumina, in the presence of an alkaline sulfate and sulfuret, the sulfurous-acid gas obtained in this process being mixed with oxygen, and then brought in contact with alkaline chlorid, to produce chlorin and alkaline sulfate, substantially as described.

In testimony whereof I have signed my name to this specification in the presence of two subscribing witnesses.

DMITRY ALEXANDROWITCH PÉNIAKOFF.

Witnesses:
EMILE DELAITE,
JULIEN DELAITE.